Dec. 16, 1924.

P. DE EULIS ET AL

CHEESE GRATER

Filed July 17, 1924　　3 Sheets-Sheet 1

1,519,532

Inventor
P. De Eulis
F. De Eulis
By Bryant & Lowry
Attorneys

Dec. 16, 1924.                                          1,519,532
P. DE EULIS ET AL
CHEESE GRATER
Filed July 17, 1924        3 Sheets-Sheet 2
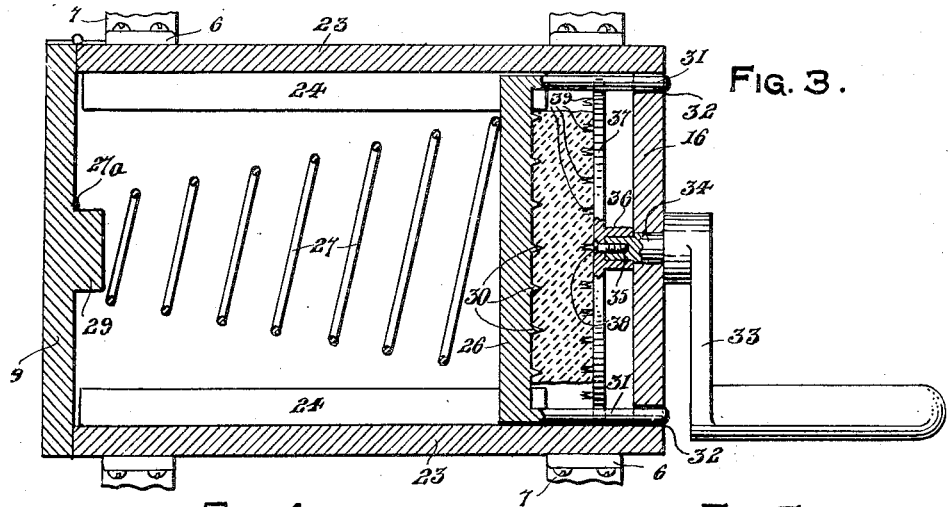
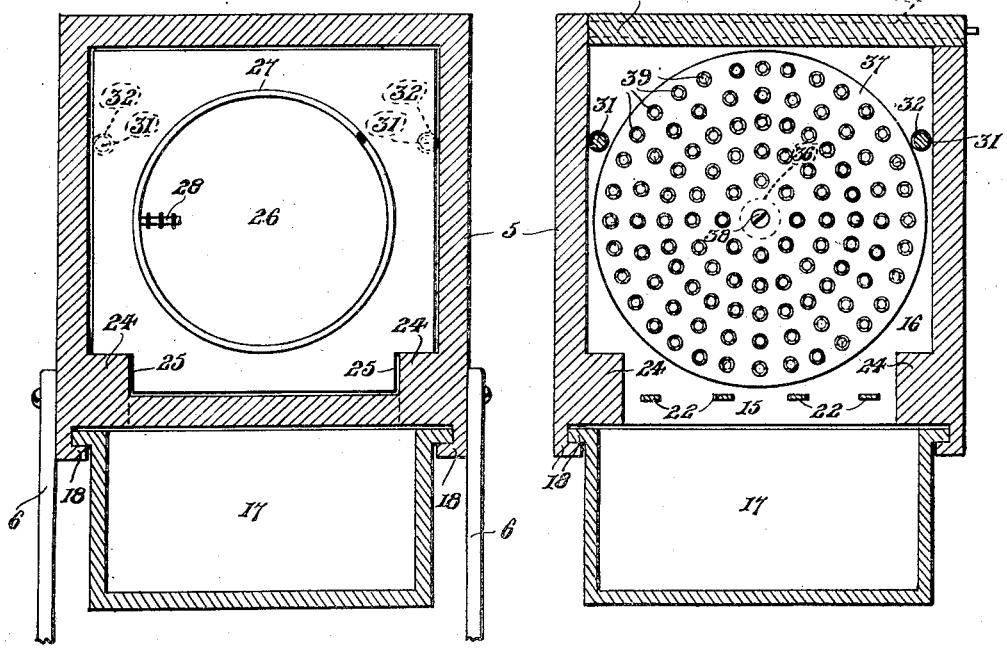
Inventor
P. De Eulis
F. De Eulis
By Bryant & Lowry
Attorneys Dec. 16, 1924.                    1,519,532
P. DE EULIS ET AL
CHEESE GRATER
Filed July 17, 1924    3 Sheets-Sheet 3

Inventor
P. De Eulis
F. De Eulis
By Bryant & Lowry
Attorneys

Patented Dec. 16, 1924.

1,519,532

UNITED STATES PATENT OFFICE.

PIETRO DE EULIS AND FRANK DE EULIS, OF RAVENNA, OHIO.

CHEESE GRATER.

Application filed July 17, 1924. Serial No. 726,512.

*To all whom it may concern:*

Be it known that we, PIETRO DE EULIS and FRANK DE EULIS, subjects of the King of Italy, residing at Ravenna, in the county of Portage and State of Ohio, have invented certain new and useful Improvements in Cheese Graters, of which the following is a specification.

This invention relates to new and useful improvements in cheese graters.

An important object of the invention is to provide a grater which will quickly and efficiently pulverize cheese subjected to its action.

A further object of the invention is to provide means for insuring against damaging the grating portion of the device by preventing further operation after the block or lump of cheese being operated upon has been reduced to a predetermined size.

Other objects and advantages of the invention will be apparent during the course of the following description.

In the accompanying drawings forming a part of this specification and in which like numerals are employed to designate like parts throughout the same,—

Figure 1:
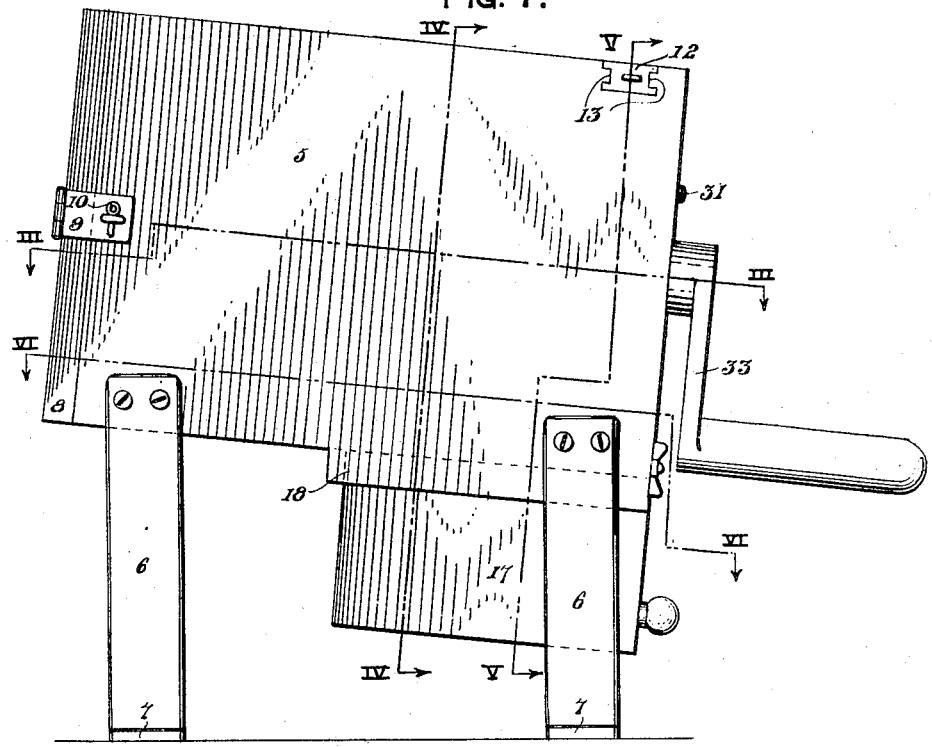
Figure 1 is a side elevational view of the apparatus embodying this invention.
Figure 6:
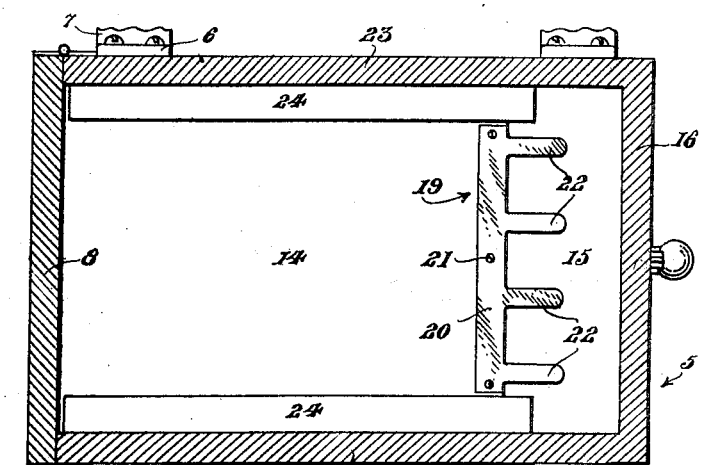
Figure 7:
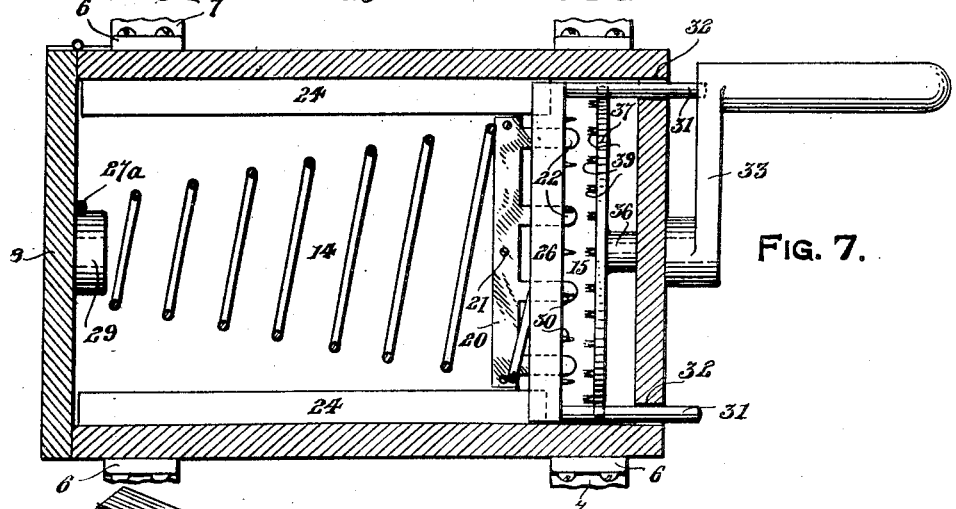
Figure 8:
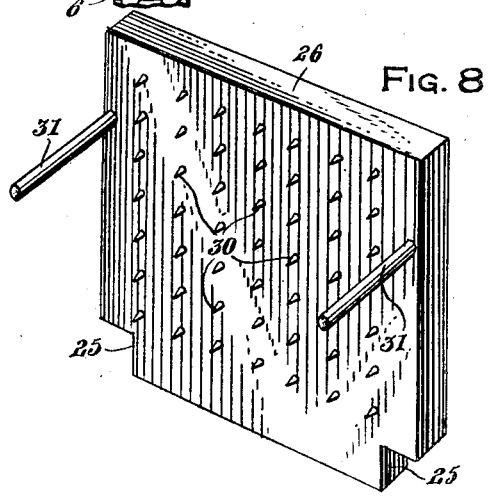
Figure 9:
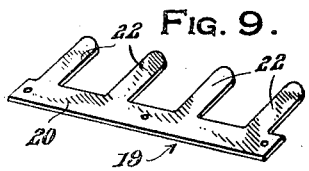

Figure 3 is a longitudinal horizontal sectional view taken upon line III—III of Fig. 1, Figure 4 is a vertical sectional view taken upon line IV—IV of Fig. 1, Figure 5 is a vertical sectional view taken upon line V—V of Fig. 1, Figure 6 is a horizontal sectional view taken upon line VI—VI of Fig. 1, Figure 7 is a horizontal sectional view similar to Fig. 3 and shows the action of the means employed for preventing the operation of the grating portion of the apparatus when there is no cheese present to be operated upon or when the block or lump of cheese being operated upon has been reduced to a predetermined size, Figure 8 is a detail perspective view of the follower employed for feeding the cheese toward the grating means, and Figure 9 is a detail perspective view of a grate member which is employed for supporting the cheese while positioned over the discharge opening through which the grated cheese drops into a removable drawer.

In the drawings, wherein for the purpose of illustration is shown a preferred embodiment of this invention, the numeral 5 designates the body portion or casing of the grater which is of box formation and is provided with the legs 6 having feet 7 which are apertured for permitting the fastening of the grater to a table or the like. This body portion or chamber is provided with a hinged door 8 at its rear end which is secured in its closed position by the hasp 9 and pin 10. The top wall of this body portion or chamber 5 is provided with a transversely extending opening 11 adjacent its front edge which is closed by a sliding door 12 having a tongue and groove connection 13, see Fig. 1, with the said chamber. This door 12 permits the inspection of the cheese positioned within the chamber 5 while it is being operated upon by the grater which will be described at a later point.

By inspecting Figs. 3, 5, 6 and 7, it will be seen that the bottom wall 14 of the chamber 5 is provided with an opening or cutout portion 15 adjacent the front wall 16 of the chamber for permitting the grated cheese to be discharged into a slidably supported drawer 17 which is connected to the chamber 5 by the flange structure 18, best illustrated in Figs. 4 and 5. For the purpose of supporting the cheese while positioned over this opening 15, a grate member 19 is provided which consists of a back portion 20 having apertures for the reception of the fastening screws 21 and integrally formed bars 22 which extend outwardly to partially bridge the opening 15.

The side walls 23 of the chamber 5 are provided with integrally formed guiding strips 24 which are positioned adjacent the lower edges of the side walls 23 and extend longitudinally thereof to terminate at the opening 15. These guide strips 24 are employed for cooperating with the rabbeted lower corners 25 of the follower 26 for the purpose of guiding the same in its travel toward the grating element. This follower 26 is constantly urged toward the front end of the chamber 5 by the helical spring 27 which is connected to the follower 26, as at 28, see Fig. 4, and is adapted to have its opposite end convolution 27ª encircling a boss 29 formed on the inner surface of the rear door 8. In Fig. 8, the follower 26 is illustrated as being provided with a plurality of spurs or prongs 30 which are employed for embedding themselves in the block or lump of cheese being operated upon for preventing the rotation of the cheese.

Projecting laterally from the face of the follower 26 having the spurs or prongs 30 projecting therefrom are the bars 31 which register with the openings 32 formed in the front wall 16 of the chamber 5 and will be projected through these openings 32 when the follower 26 reaches its position as illustrated in Figs. 3 and 7. The purpose of providing these bars 31 will be described at a later point.

Figure 2:
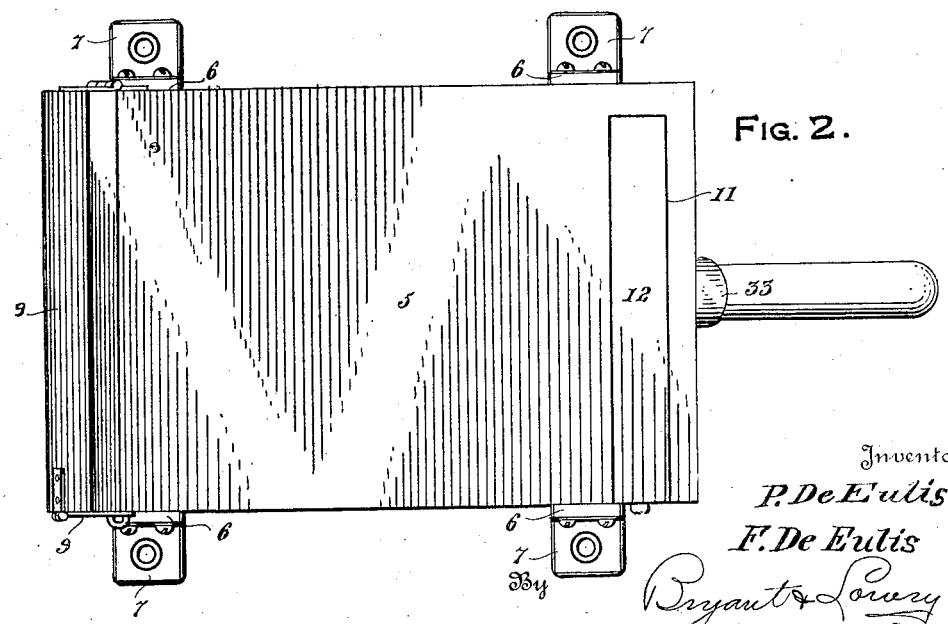
Figure 2 is a top plan view of the apparatus illustrated in Fig. 1.

A crank arm or handle 33 is illustrated in Figs. 1 to 3 inclusive and 7 and is provided with a stem 34 which is journaled in the front wall 16 of the chamber 5 and is provided with a reduced squared portion 35 adapted to receive the tubular boss 36, which has a square bore in cross-section, carried by the disk-shaped grater element 37. This disk-shaped grater element 37 is secured to the reduced squared portion 35 of the stem 34 by the screw 38, as best illustrated in Figs. 3 and 5. This disk-shaped grater element 37 is provided with a multiplicity of four-pointed prongs 39 which are arranged in any desired manner upon the inner surface of the said grater disk.

The operation of this cheese grater is as follows:—

To place a block or lump of cheese within the chamber 5, the pin 10 is removed from the hasp lock 9 for permitting the door 8 to be opened. The follower 26 is then withdrawn from the chamber 5 and a block or lump of cheese placed within the latter. The follower 26 is then returned to its position within the chamber and the door 8 closed and locked. The follower 26 will be urged forwardly by the helical spring 27 for forcing the block or lump of cheese against the disk 37. It will now be seen that by operating the handle 33 the grating disk 37 will be rotated and its movement relative to the cheese, which is held stationary by the spurs or studs 30 carried by the follower 26, will cause the front face of the cheese to be acted upon for pulverizing or grating the same. The pulverized or grated cheese will drop through the opening 15 into the removable drawer 17 which may be withdrawn for dumping the grated cheese therefrom. It will be seen that as the follower 26 travels longitudinally through chamber 5 for maintaining the lump or block of cheese in operative engagement with the grating disk 37, the bars 31, carried by this follower 26, will gradually travel through the openings 32 formed in the front wall 16 of the chamber 5 until these bars will have been moved so that their outer ends intersect the path of travel of the crank handle 33. This handle will then be prevented from rotating and the operator of the grater will know that the lump or block of cheese has been substantially diminished or reduced in size and that the prongs or spurs 30 carried by the follower 26 are in close proximity to the four-pointed prongs on the grating disk 37. The operator will then open the rear door 8 and remove the remains of the cheese from the chamber 5. It will be seen that during the operation of grating the cheese, the slidable door 12 may be withdrawn from the opening 11 for inspecting the cheese.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:—

1. In a device of the type described, a chamber for the reception of the cheese to be operated upon, a rotatable grating element within said chamber having a roughened surface, means for operating said grating element, a spring pressed follower for forcing the cheese against said element, said follower having a roughened surface for preventing the rotation of the cheese during the rotary movement of the grating element, and means carried by said follower adapted to engage the grating element operating means for preventing the further operation of the rotatable grating element when the roughened surfaces of this grating element and the follower are located in close proximity to each other.

2. In a device of the type described, a chamber for the reception of the cheese to be operated upon, a discharge opening formed in said chamber, a rotating grating element within said chamber above said discharge opening, means for forcing the cheese against said grating element, and means carried by said chamber and partially bridging the discharge opening for preventing the cheese being operated upon from falling through the opening prior to the grating of the same.

3. In a device of the type described, a cheese support, a movable grating element carried thereby, means for forcing cheese toward said grating element, and means carried by the cheese forcing means, rendered active upon the arrival of said forcing means in proximity to the grating element, for preventing the further operation of the grating element.

4. In a device of the type described, a cheese support, a movable grating element carried thereby, means for operating said grating element, means for forcing cheese toward said grating element, and means carried by the cheese forcing means, rendered active upon the arrival of said forcing means in proximity to the grating element, for engaging the grating element operating means for preventing the further operation of said grating element.

5. In a device of the type described, a cheese support, a rotatable grating element carried thereby, a crank for operating the grating element, means for forcing cheese toward said grating element, and a projection carried by the cheese forcing means automatically moved into the path of travel of said crank upon the arrival of said forcing means in proximity to the grating element, for preventing the further operation of the grating element.

In testimony whereof we affix our signatures.

PIETRO DE EULIS.
FRANK DE EULIS.